Jan. 7, 1964 V. J. MODIANO 3,117,288

CONSTANT AMPLITUDE OSCILLATOR

Filed July 7, 1959 2 Sheets-Sheet 1

Jan. 7, 1964 V. J. MODIANO 3,117,288

CONSTANT AMPLITUDE OSCILLATOR

Filed July 7, 1959 2 Sheets-Sheet 2

United States Patent Office 3,117,288

Patented Jan. 7, 1964

3,117,288
CONSTANT AMPLITUDE OSCILLATOR

Victor J. Modiano, Los Angeles, Calif., assignor to Robertshaw Controls Company, a corporation of Delaware Filed July 7, 1959, Ser. No. 825,530
14 Claims. (Cl. 331—109)

This invention relates generally to electronic oscillators and more particularly to such oscillators for deriving sine wave oscillations of a predictable amplitude.

It is an object of this invention to control the amplitude of sine wave oscillations derived from an electronic oscillator.

It is another object of this invention to prevent power supply variations and amplifier element characteristic variations from affecting the amplitude of oscillation derived from an oscillator.

Another object of this invention is to utilize a plurality of asymmetrical conducting devices in the power supply and current collecting electrode circuits of an oscillator to produce sine wave oscillations of a predictable amplitude.

A further object of this invention is to utilize a Zener diode and a feedback network in an oscillator circuit to maintain a predetermined amplitude of oscillatory output therefrom.

With these and other objects in view, one embodiment of this invention may take the form of an oscillator circuit including an oscillatory tank circuit coupled to a parallel electrode amplifier element. A source of operating potential is connected to the amplifier element through a circuit including plural asymmetrical conducting devices to limit the amplitude of the oscillatory output from the amplifier element. In another embodiment of this invention, means including a feedback network may be provided between the plural asymmetrical conducting devices and another electrode of the amplifier element to further control the amplitude of the oscillatory output from the amplifier element.

These and other objects and advantages will become apparent from the following description taken in connection with the accompanying drawings, wherein like reference numerals indicate like parts, and wherein.

Figure 1:
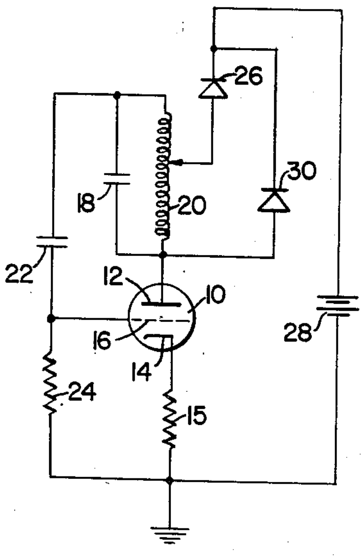
FIG. 1 is a schematic showing of one embodiment of this invention.

The embodiment of this invention shown in FIG. 1 comprises an electron discharge device 10 which is connected as a self-excited oscillator. Electron discharge devide 10 includes the usual anode 12, cathode 14, and grid 16. The cathode 14 is connected by a resistor 15 to a point of constant potential, for example ground, and the anode 12 is connected to one end of a conventional oscillatory tank circuit, comprising a capacitor 18 and a tapped inductance 20 connected in parallel. To complete the oscillator circuit, the other end of the oscillatory tank circuit is connected to the grid 16 through a capacitor 22. A grid leak resistor 24 is shown connecting the grid 16 to ground.

Means are provided to limit the amplitude of oscillation appearing at the anode 12 and take the form of a Zener diode 26, having one electrode connected to the inductance 20 and another electrode connected to the positive pole of a suitable source of D.C. potential, such as a battery 28 which has a negative pole connected to ground. Another diode 30 is connected between the anode 12 and the positive pole of the battery 28.

In the operation of the embodiment of FIG. 1, it is desired to maintain at anode 12 an oscillatory output having a constant determinable frequency and amplitude which is substantially independent of tube characteristic variations and variations in the magnitude of the potential derived from the unregulated source, battery 28.

As will be apparent from FIG. 1, the resistor 24 establishes a bias for the grid 16 of electron discharge device 10. Capacitor 18 and inductance 20 provide an oscillatory tank circuit, while capacitor 22 provides feedback between the tank circuit and the grid 16.

The Zener diode 26 is connected in inverse sense between the tap on the inductance 20 and the positive pole of battery 28, and conducts in "Zener" fashion in response to the applied potential. It is characteristic of a diode conducting in the Zener breakdown region that the potential across the diode remains substantially constant for all values of current. Thus, with the diode 26 selected to conduct at a preselected Zener breakdown potential, which potential is of a smaller magnitude than the potential of battery 28, it will be apparent that the potential applied to anode 12 of tube 10 will be substantially equal to the potential of battery 28 minus the Zener breakdown potential of diode 26.

Figures 2, 3:
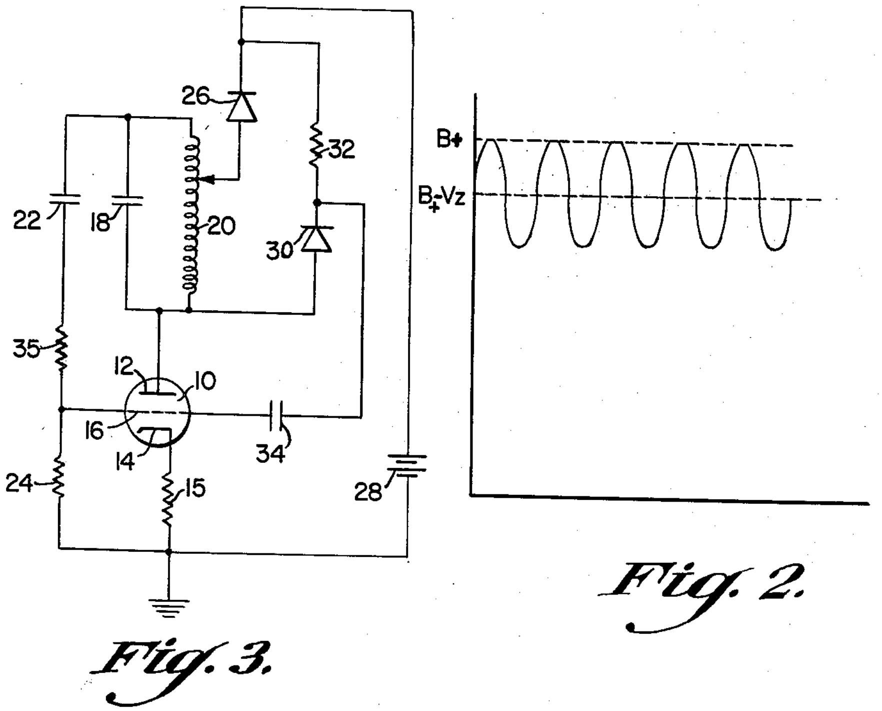
FIG. 2 is a diagrammatic representation of the oscillatory output from the embodiment of FIG. 1.
FIG. 3 is similar to FIG. 1 showing another embodiment of this invention.

The amplitude of the oscillatory output derived from the oscillator is selected to exceed the Zener breakdown potential of diode 26 and is diagrammatically illustrated in FIG. 2. In FIG. 2, the designation B+ corresponds to the potential of battery 28 while the designation $V_z$ corresponds to the Zener breakdown potential of diode 26. Under these conditions of operation, the oscillatory output from the oscillator will vary about the potential, B+ minus $V_z$, appearing at anode 12 of the electron discharge device 10.

In order to limit the amplitude of oscillation in the oscillator, the diode 30 is selected to conduct whenever the potential at the anode 12 exceeds B+, the potential of the battery 28. Thus, with the amplitude of the oscillatory output selected to exceed the Zener breakdown potential $V_z$ of diode 26, the diode 30 will conduct at each positive peak of the oscillatory output which exceeds B+. The continuous positive feedback from electron discharge device 10 to the oscillatory tank circuit maintains the diode 30 in continuous conduction.

As is apparent from FIG. 2, the positive peak amplitude of the oscillatory output is limited to the Zener breakdown potential $V_z$ upon continuous conduction of the diode element 30 to maintain the positive peak amplitudes of the oscillatory output slightly flattened.

In the preferred embodiment of FIG. 3, a resistor 32 is connected intermediate the diode 30 and the positive pole of the battery 28. A capacitor 34 connects the grid 16 of tube 10 to the junction intermediate diode element 30 and resistor 32 while a resistor 35 is connected in series with capacitor 22 intermediate the grid 16 and the oscillatory tank circuit.

The anode of diode 30 need not be connected only at the anode of the triode, but could be connected at any desirable tap on the coil in order to achieve the desired characteristics. Putting the diode anode at the triode anode is simply a convenience.

In this embodiment, upon conduction of the diode element 30, when the potential at anode 12 exceeds B+, a negative feedback is provided at the grid 16 of electron discharge device 10 via the coupling capacitor 34. Since the anode potential is thus applied to grid 16 without attenuation, control over the amplitude of the oscillatory output from the oscillator is achieved. Moreover, this operation renders the amplitude of the oscillatory output from the oscillator substantially independent of B+ and tube characteristic variations.

Figure 4:
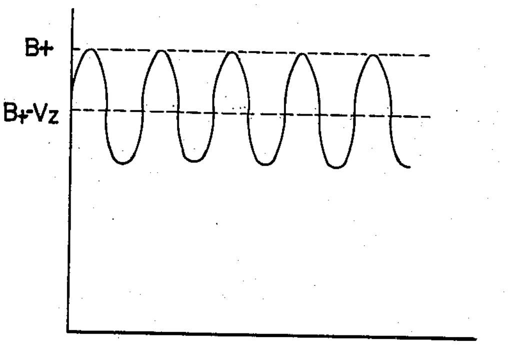
FIG. 4 is similar to FIG. 2 diagrammatically representing the output from the embodiments of FIGS. 3 and 5.

The oscillatory output from the embodiment of FIG. 3 is illustrated in FIG. 4, wherein the slightly flattened positive peaks in the embodiment of FIG. 1 due to the conduction of diode element 30 have been eliminated. The wave form from the embodiment of FIG. 4 is seen to be a substantially perfect sinusoidal output in that the oscillatory tank circuit functions as a filter for the transient negative feedback applied to the grid 16. Moreover, the oscillatory output from the oscillator of FIG. 3 is maintained at the predetermined amplitude of $V_z$, provided of course that the normal oscillatory output is of a greater amplitude than $V_z$.

Figure 5:
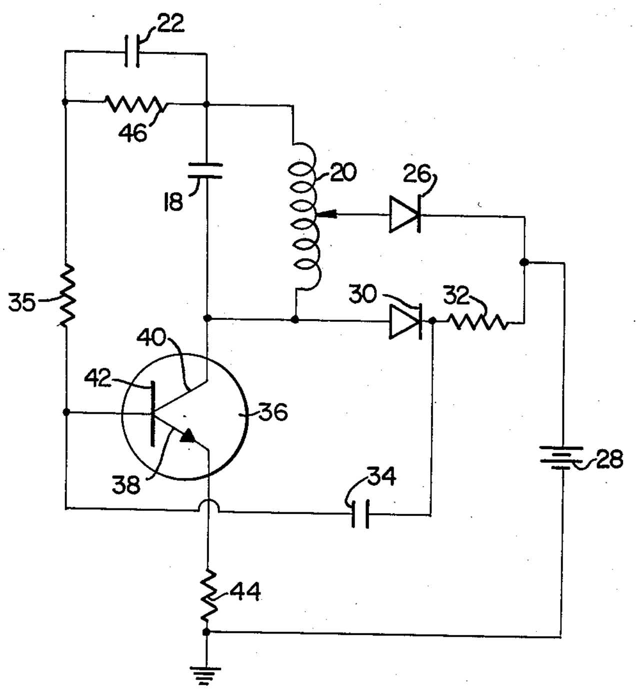
FIG. 5 is a view similar to FIG. 1 showing yet another embodiment of this invention.

In the embodiment of FIG. 5, a transistor 36, having the usual emitter electrode 38, collector electrode 40, and base electrode 42, is substituted for the electron discharge device 10 of the prior embodiments. The emitter electrode 38 is connected to ground potential or to the negative pole of battery 28 by a resistor 44. The collector electrode 40 is connected directly to one end of the oscillatory tank circuit comprising capacitor 18 and inductance 20.

A positive feedback path between the oscillatory tank circuit and base electrode 42 is provided by the series circuit comprising capacitor 22 and resistor 35. Capacitor 34 forming the negative feedback path is connected directly to base electrode 42. Resistor 46, connected in shunt with capacitor 22, together with resistor 35 establish a bias for base electrode 42 suitable to produce the conditions required for oscillations to be generated.

The oscillatory output derived from this embodiment is substantially the same as the output from the embodiment of FIG. 3 and is also illustrated in FIG. 4. Thus, the potential applied to collector electrode 40 will be equal to B+ minus $V_z$ and the oscillatory output appearing thereat will vary thereabout. Positive peak amplitudes of oscillatory output which exceeds B+ potential will cause conduction of diode element 30 and a negative feedback will be impressed upon the base electrode 42, via capacitor 34, to control the amplitude of the oscillatory output at collector electrode 40.

In the embodiment of FIG. 5, just as in the embodiment of FIG. 3, the oscillatory output is a near perfect sine wave of a predetermined amplitude which is substantially independent of voltage supply and amplifier element characteristic variations.

While only three embodiments of the present invention have been shown and described herein and inasmuch as this invention is subject to many modifications and reversals of parts, it is intended that all matter contained in the above description shall be interpreted as illustrative and not in a limiting sense.

I claim:

1. An oscillator comprising the combination of an electron discharge device having an anode, a cathode, and a grid, a feedback path including a tank circuit in the form of a tapped inductance and a capacitor connected in parallel between said anode and said grid to produce self-oscillation by said electron discharge device, a source of anode potential for said electron discharge device, a first asymmetrical conducting device connecting said source of potential to said anode, and a second asymmetrical conducting device connecting said source of potential to the tap on said inductance, said first asymmetrical conducting device comprising a diode conducting at a predetermined value of said anode source potential, said second asymmetrical conducting device comprising a diode operating in the Zener breakdown region, whereby the oscillatory output from said electron discharge device is limited to a predetermined amplitude.

2. An oscillator comprising the combination of an electron discharge device having an anode, a cathode, and a grid, a feedback path including a tank circuit in the form of a tapped inductance and a capacitor connected in parallel between said anode and said grid to produce self-oscillation by said electron discharge device, a source of anode potential for said electron discharge device, a first asymmetrical conducting device operating in the Zener discharge region connecting said source of potential to the tap on said inductance, a second asymmetrical conducting device conducting at a predetermined value of said anode source potential connecting said source of potential to said anode, and a feedback path connecting the output from said second asymmetrical conducting device to said grid whereby the oscillatory output from said electron discharge device is limited to a predetermined magnitude.

3. An oscillator comprising the combination of a transistor having an emitter electrode, a collector electrode, and a base electrode, a feedback path including a tank circuit in the form of a tapped inductance and a capacitor connected in parallel between said collector electrode and said base electrode to produce self-oscillation by said transistor, a source of bias potential for said transistor, a first asymmetrical conducting device operating in the Zener discharge region connecting said source of bias potential to the tap on said inductance, and a second asymmetrical conducting device conducting at a predetermined magnitude of said bias potential connecting said source of bias potential to said collector electrode for limiting the oscillatory output from said transistor to a predetermined amplitude.

4. An oscillator comprising the combination of a transistor having an emitter electrode, a collector electrode, and a base electrode, a feedback path including a tank circuit in the form of a tapped inductance and a capacitor connected in parallel between said collector electrode and said base electrode to produce self-oscillation by said transistor, a source of bias potential for said transistor, a first asymmetrical conducting device operating in the Zener discharge region connecting said source of bias potential to the tap on said inductance, a second asymmetrical conducting device conducting at a predetermined magnitude of said bias potential connecting said source of bias potential to said collector electrode, and a feedback path connecting the output from said second asymmetrical conducting device to said base electrode whereby the oscillatory output from said transistor is limited to a predetermined magnitude.

5. An electronic oscillator circuit including a plural electrode amplifying device, a direct current source of operating potential, a non-linear resistance element having a smaller value of incremental resistance for larger values of current, means connecting said resistance element and said direct current source in series to one of said plural electrodes, a circuit including an asymmetrical conducting device connected in parallel with said means and said resistance element to conduct when the electrical potential at said one electrode exceeds the electrical potential of said direct current source, and means biasing said amplifying device to lowered conduction in accordance with said increase of potential above said potential of the direct current source.

6. The oscillator circuit of claim 5 wherein said connecting means includes a frequency controlling device.

7. The oscillator circuit of claim 5 wherein said nonlinear resistance element is a diode connected to have substantially a constant voltage drop thereacross governing the amplitude of the oscillator output.

8. An electronic oscillator circuit including a plural electrode amplifying device, a direct current source of operating potential, a non-linear resistance element having a smaller value of incremental resistance for larger values of current, means connecting said resistance element and said direct current source in series to one of said plural electrodes, a circuit including an asymmetrical conducting device connected in parallel with said means and said resistance element to conduct when the electrical potential at said one electrode exceeds the electrical potential of said direct current source, and means coupling the output of said asymmetrical conducting device to another of said plural electrodes whereby the oscilaltory output from said device is limited to a predetermined magnitude.

9. An electronic oscillator circuit comprising a transistor having base, emitter, and collector electrodes, a direct current source, a non-linear resistance element having a smaller value of incremental resistance for larger values of current, means connecting said resistance element and said direct current source in series to said collector electrode, a circuit including an asymmetrical conducting device connected in parallel with said means and said resistance element to said collector electrode to conduct when the electrical potential of said collector electrode exceeds the electrical potential of said direct current source, and bias means for said transistor connected to reduce conductivity thereof as the potential of said collector exceeds that of said direct current source.

10. An electronic oscillator circuit comprising a transistor having base, emitter and collector electrodes, a direct current source, a non-linear resistance element having a smaller value of incremental resistance for larger values of current, means connecting said resistance element and said direct current source in series to said collector electrode, a circuit including an asymmetrical conducting device connected in parallel with said means and said resistance element to said collector electrode to conduct when the electrical potential at said collector electrode exceeds the electrical potential of said direct current source, and means coupling the output of said asymmetrical conducting device to said base electrode whereby the oscillatory output from said transistor is limited to a predetermined magnitude.

11. An electronic oscillator circuit comprising an electron discharge device having an anode, cathode and control grid, a direct current source, a non-linear resistance element having a smaller value of incremental resistance for larger values of current, means connecting said resistance element to said direct current source in series to said anode, a circuit including an asymmetrical conducting device connected in parallel with said means and said resistance element to said anode to conduct when the electrical potential at said anode exceeds the electrical potential of said direct current source, and means biasing said discharge device to lowered conduction as said anode potential exceeds said source potential.

12. The oscillator of claim 11 wherein said nonlinear resistance element is operative to produce a constant voltage reference increment below that of said direct current source.

13. The oscillator of claim 11 wherein said means connecting said resistance element in series to said anode includes a tank circuit.

14. An electronic oscillator circuit comprising an electron discharge device having an anode, cathode and control grid, a direct current source, a non-linear resistance element having a smaller value of incremental resistance for larger values of current, means connecting said resistance element to said direct current source in series to said anode, a circuit including an asymmetrical conducting device connected in parallel with said means and said resistance element to said anode to conduct when the electrical potential of said anode exceeds the electrical potential of said direct current source, and means coupling the output of said asymmetrical conducting device to said control grid whereby the oscillatory output of said electron discharge device is limited to a predetermined magnitude.

References Cited in the file of this patent

UNITED STATES PATENTS

| | | |
|---|---|---|
| 2,587,294 | Dorbec | Feb. 26, 1952 |
| 2,760,070 | Keonjian | Aug. 21, 1956 |
| 2,854,615 | Light | Sept. 20, 1958 |
| 2,874,293 | McMurren | Feb. 17, 1959 |
| 2,960,666 | Brewser et al. | Nov. 15, 1960 |

OTHER REFERENCES

Electronics, December 1953, page 208, "Stabilized Transistor Audio Oscillator."